No. 855,185. PATENTED MAY 28, 1907.
W. W. W. KEYES.
MACHINE FOR MAKING SHEET OR PLATE GLASS.
APPLICATION FILED FEB. 15, 1904. RENEWED NOV. 1, 1906.
3 SHEETS—SHEET 2.
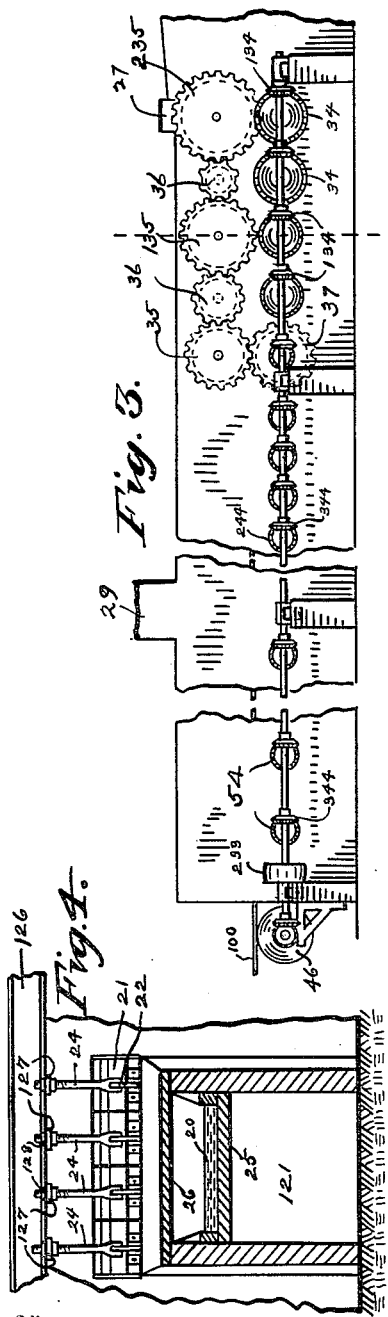
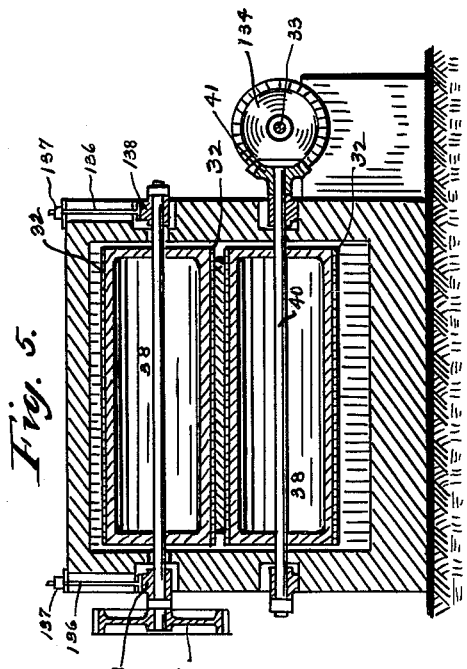
Witnesses
H.G. Stuart
Inventor
Wm. H. W. Keyes
By V. H. Lockwood
Attorney

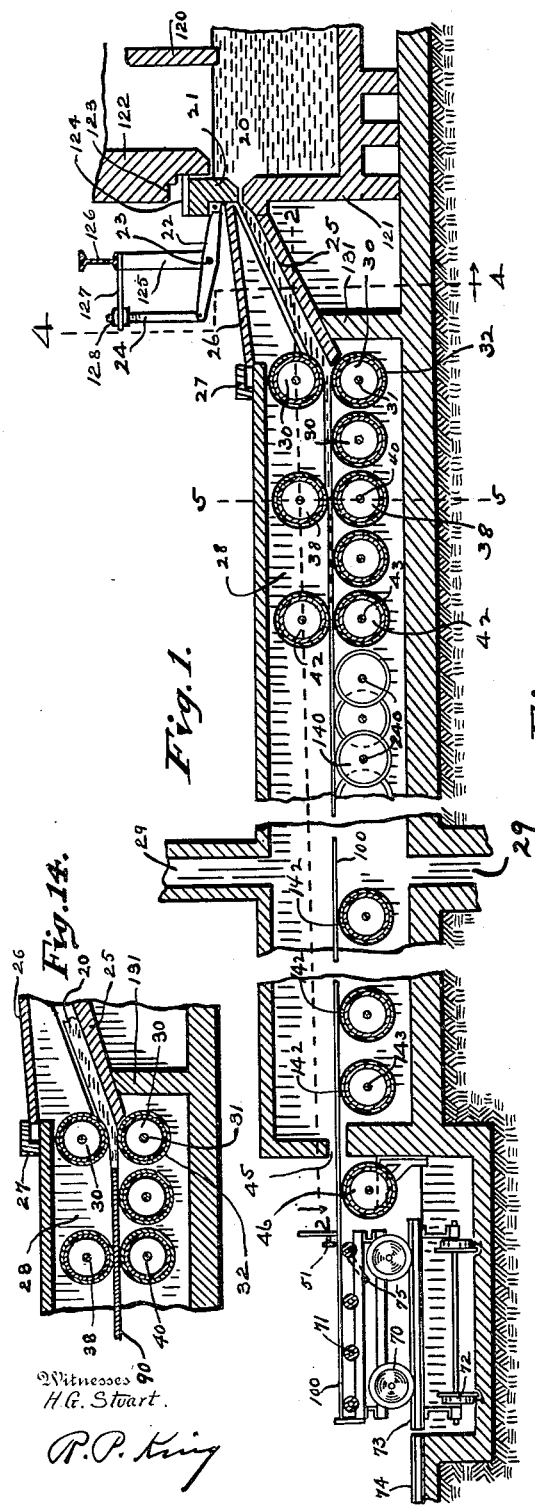

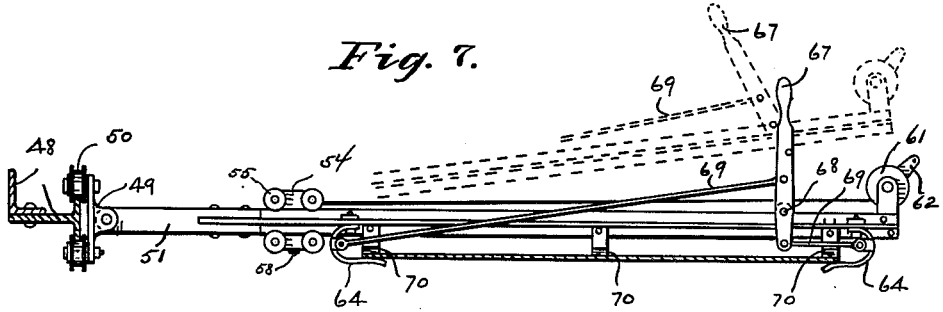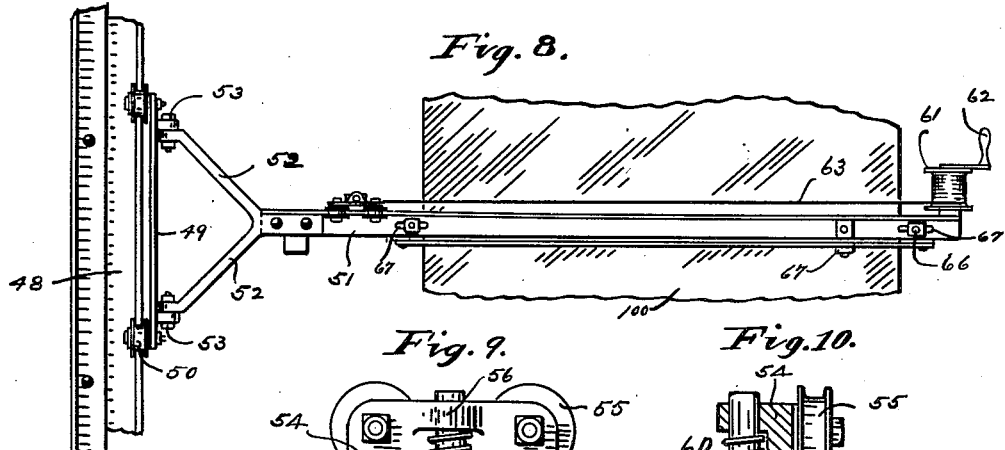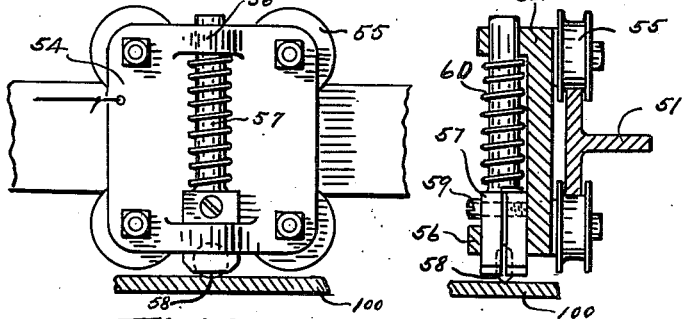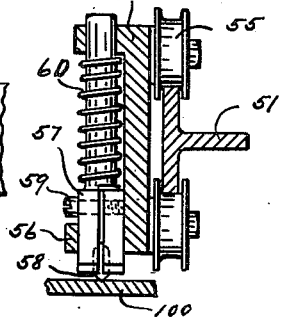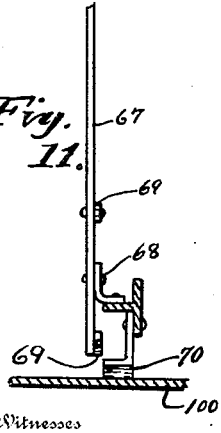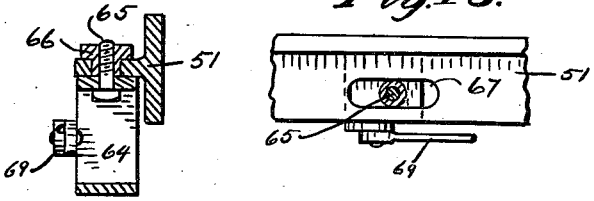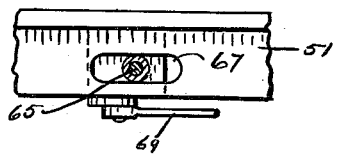

UNITED STATES PATENT OFFICE.

WILLIAM W. W. KEYES, OF ALEXANDRIA, INDIANA, ASSIGNOR OF ONE-EIGHTH TO JOHN A. KEYES, ONE-FOURTH TO JOHN F. MERKER, AND ONE-EIGHTH TO JAMES FALL, OF ALEXANDRIA, INDIANA.

MACHINE FOR MAKING SHEET OR PLATE GLASS.

No. 855,185.     Specification of Letters Patent.     Patented May 28, 1907.

Application filed February 15, 1904. Renewed November 1, 1906. Serial No. 341,622.

*To all whom it may concern:*

Be it known that I, WILLIAM W. W. KEYES, of Alexandria, county of Madison, and State of Indiana, have invented a certain new and useful Machine for Making Sheet or Plate Glass; and I do hereby declare that the following is a full, clear, and exact description thereof, reference being had to the accompanying drawings, in which like letters refer to like parts.

The object of this invention is to provide a machine for forming sheets of glass by rolling and drawing in contradistinction to blowing. To accomplish this general object, the machine contains a tank for the glass in its molten state with a horizontal outlet through which the glass may flow by gravity alone down over an inclined table to rolls which receive the glass and form it by subsequent rolling and drawing of the same. Along with the foregoing, means for regulating the flow of the glass from the tank is provided and also a leer connected with the tank, and into which the glass flows over the inclined table, and means is provided in connection with the foregoing to keep the glass heated from the time it leaves the tank until it leaves the leer.

One feature of the invention consists in a plurality of rolls arranged in independent series, each succeeding series rotating at a higher speed than the preceding series whereby the mass of glass is caused to travel at successively increasing speeds, so that the sheet of glass while being rolled is pulled or drawn to stretch or straighten it and prevent wrinkling.

Another feature of the invention consists in the glass cutting mechanism herein shown in connection with the foregoing for cutting the sheet of glass into individual sheets.

For a comprehensive understanding of the invention, reference is had to the accompanying drawings in which Figure 1 is a longitudinal vertical section of the machine, parts being broken away. Fig. 2 is a horizontal section on the line 2—2 of Fig. 1. Fig. 3 is a side elevation of a part of the machine, parts being broken away or removed. Fig. 4 is a cross-section on the line 4—4 of Fig. 1, parts being broken away. Fig. 5 is a cross section on the line 5—5 of Fig. 1. Fig. 6 is an end elevation of the cutting and delivering mechanism, their parts being shown in vertical cross-section and partly broken away. Fig. 7 is an elevation of the cutting mechanism, parts being in cross-section, and the changed position of some of the parts being in dotted lines. Fig. 8 is a plan view of what is shown in Fig. 7. Fig. 9 is a side elevation of the carriage containing the cutter and the supporting bar on which it moves, the latter being broken away and the sheet of glass being shown in section. Fig. 10 is a vertical section of Fig. 9 to the right of the center of said figure. Fig. 11 is a cross-section of a part of a sheet of glass and of the supporting bar for the cutter carriage, the means for actuating the clamps appearing in elevation. Fig. 12 is a similar view at the point of connection of one of the clamps with the supporting bar but on a larger scale than in Fig. 11. Fig. 13 is a plan view of what is shown in Fig. 12, the clamping means being in section and parts broken away. Fig. 14 shows a part of Fig. 1 with the glass drawing or starting plate in use.

Referring to the details of construction, 20 represents a glass tank for holding the glass in the molten state with a depending shield or damper 120. A horizontal outlet along one end of said tank is provided between the lower wall 121 and upper wall 122. The upper wall is cut away at 123 to make room for the location and operation of a number of closing blocks 21. These blocks rest upon the wall 121 when not held in an elevated position, and lie beside each other, as seen in Fig. 4. They may be moved up and down so as to regulate the opening between them and the wall 121 through which the glass may flow from the tank by gravity. Plates 124 of some suitable material are secured on the blocks 21 that extend inward beyond the top of said blocks to engage the outer surface of the wall 122 so as to make a tight closure between the blocks 21 and the wall 122 during the adjustment of the former as well as at all other times.

The movement of the blocks 21 to adjust the outlet opening from the tank is effected by levers 22, one pivoted to each block 21 and centrally pivoted to the lower end of bars 125 depending from a cross beam 126 above. To the outer ends of the levers 22 rods 24 are pivoted that extend up through brackets 127 secured to the cross-beam 126, and the rods 24 are held in position by nuts 128, so that by screwing or unscrewing the nuts 128 the size of the outlet opening between the blocks 21 and the wall 121 of the tank may be adjusted and maintained in the adjusted position.

A leer 28 is built adjacent the glass tank, and in that leer the sheet of glass is both formed and annealed. To accomplish this it is necessary, of course, that the leer be heated, but with this peculiar combination of the leer being adjacent to the tank of glass the heat from the glass flowing into the leer is sufficient for this purpose. And for the purpose of annealing the glass it is necessary to reduce the temperature somewhat toward the outlet end, and, therefore, the flues 29 are provided. Since the blocks 21 are vertically movable it is necessary to provide a movable top to the end of the leer adjacent the glass tank to prevent the escape of the heat. Therefore, a movable top 26 is provided, secured along one edge of the blocks 21, and at the other end slips loosely on the top of the leer and in a recess under an overlapping socket piece 27.

An inclined table 25, made preferably of asbestos, leads from the outlet opening of the tank downward to the rolls in the leer. It rests upon a transverse wall 131. As the molten glass flows by gravity down over the table 25, it encounters a primary set of forming rolls 30, said rolls being mounted upon suitable shafts 31 which project outside the leer. The lower rolls of said set are designed to support the mass of glass, while the upper roll co-operates with one of the lower rolls to convey and reduce the thickness of the mass of glass as the latter passes between them. The rolls are preferably covered with asbestos, as shown at 32, to withstand the heat of the molten glass, and the rolls are preferably hollow.

The second lower roll 30 is like the first lower roll 30 and revolves in the same direction and at the same speed. There is a second set of three rolls 38 similar to the first set, and another set of two rolls 42 similar to the others. All the rolls are driven from a shaft 33 outside the lower set of rolls. The lower rolls are driven directly from said shaft through a pair of bevel gears. The lower rolls 30 have on their shafts 31 bevel gears 34 that mesh with gears 134 on the shaft 33 which are of the same size. The shafts 40 of the lower rolls 38 have bevel gears 41 on them of the same size that mesh with the gears 134 on the shaft. The gears 41 are smaller than the gears 34. The shaft 43 of the lower roll 42 has a gear 44 that meshes with the gear 144.

The upper rolls 30, 38, and 42 are driven by the following means. The shaft 43, on the lower roll 42 has on one end a gear 37, shown in dotted lines in Fig. 3, and meshes with a gear 35 on the shaft of the upper roll 42. An intermediate gear 36 transmits the power from the gear 35 to the gear 135 on the shaft of the upper roll 38. An intermediate gear 36 transmits power from the last mentioned gear to the gear 235 secured on the shaft of the first upper roll 30. The gears 35, 135 and 235 are increased gradually in diameter so said upper rolls will travel at gradually increased speeds in the order of their distance from the glass tank, and also the dimensions of these gears is such that all the rolls 30 will be driven at the same speed, and all the rolls 38 at the same speed, and all the rolls 42 at the same speed. The upper rolls are rendered vertically adjustable by the rods 136 and nuts 137, as seen in Fig. 5, whereby the bearings 138 in which the tops of said rolls are mounted vertically movable and held in position. Another sort and series of rolls 140 are provided on the shafts 240, which are driven by gears 244 and 344. The rolls 140 are narrow, three or four being on each shaft, and the rolls on the different shafts are placed to alternate and interlace with each other, as appears in Figs. 1 and 2. This is to support the sheet of glass while it is hot. Another set of rolls 142 are provided on shafts 143, and driven at the same speed as the rolls 140 and by the same means. The rolls 140 and 142 are driven slightly faster than the preceding rolls. The rolls 142 are farther apart than the rolls 140, for when the sheet of glass reaches them it is cooler and stiffer. The shaft 33 is driven by a pulley 233.

At the outlet end of the leer there is an outlet opening 45 through which the glass passes to a roll 46 outside the leer similar to the rolls 142 and driven in the same way and at the same speed. From that roll the sheet of glass goes to the truck 70. This truck carries a series of smaller rolls 71 which receive the glass. The truck has a pair of wheels that travel on another truck 72 which runs in a transverse direction, as seen in Fig. 1. The rails 73 that carry the upper truck may be moved into alinement with the rails 74 forming a track on which the truck and sheet of glass 100 may be removed. The first one of the rolls 71 is mounted eccentrically and may be rotated by the crank 75. The purpose of this is to lower the top surface of the roller so that it will run under the approaching edge of the glass sheet as the truck is moved in toward the leer. When the truck is in place, the eccentric of the mounted roll is turned so as to raise its upper surface.

It is, of course, necessary to sever the sheet as the same leaves the delivery opening 45, and to the accomplishment of this end, the construction illustrated in Figs. 1, 2, and 7 to 13 is employed. As before stated, the invention requires a construction of cutting mechanism that will positively insure an accurate cut and while the sheet of glass is moving, and recourse is, therefore, had to the construction which will now be described.

By referring especially to Figs. 7 and 8, the numeral 48 designates a bar or track arranged in proximity to the delivery end of the leer 28 and extending in a direction parallel with the plane or path of movement of the sheet as the same is delivered from said leer. This track is preferably formed of angle iron, and mounted on said track is a traveling carriage 49 to which are journaled the rollers 50 which travel on the flanges of the track 48 to enable the carriage 49 to readily work thereon. A transverse supporting bar 51, also of angle iron, is provided with a bifurcated bracket 52, the legs of which are suitably pivoted, as at 53 to the carriage 49, and consequently said supporting bar may be readily swung upon its pivots in a vertical plane. A cutter carriage 54 is mounted upon the bar 51, said carriage being provided with rollers 55 which move upon the bar 51, and one face of said carriage is provided with outwardly extending parallel perforated lugs 56 in which is seated a vertically arranged cutter holder 57, the lower end of which is divided and embraces a diamond or cutter 58 designed to act upon the surface of the glass. A set screw 59 is carried by the divided end of the holder 57 through the medium of which the cutter 58 is held in said holder, and the latter is also surrounded by a coil spring 60, the upper end of which takes against the upper end of the lug 56, said spring normally exerting its tension to force the cutter into yielding contact with the surface of the glass. Journaled upon the free end of the supporting bar 51 is a spool or drum 61, the latter being provided with a crank 62 for rotating the spool or drum, and coiled upon said spool or drum is a cable 63 which is connected with the carriage 54. Consequently when the cable 63 is wound upon said spool or drum 61, the carriage 54 is caused to travel upon the supporting bar 51 and across the surface of the glass, thus causing the cutter 58 to act upon the glass and to sever the same in a plane transverse to the direction of its movement. It is also held desirable that when the sheet of glass is delivered beneath the supporting bar 51 to be acted upon by the cutter, said sheet should have a substantially fixed relation to said supporting bar, and in order to attain this desirable end, a pair of reversely arranged curved clamps 64 is employed, said clamps being arranged at the under side of the bar 51, and provided with upwardly extending bolts 65 upon which are threaded flanged nuts 66. The bolts 65, however, pass through elongated slots, thereby forming guides and permitting the clamps 64 to have a limited movement toward and away from the edges of the glass sheet. To effect the movement of the clamps referred to a lever 67 is pivoted at one side of the bar 51, as at 68, and connected with said lever above and below the fulcrum 68 are links 69 which are also pivotally connected with the clamps 64. It will thus be evident that when the lever 67 is swung upon its fulcrum, the links 69 will be forced to move in opposite directions, thereby imparting to the clamps 64 movement either toward or away from the sheet of glass, and consequently, according to the direction of movement of the lever 67, the clamp 64 will be caused to either engage the edges of the glass sheet or be released therefrom. The bar 51 is also provided with a downwardly extending lug 70 against which the sheet of glass is designed to rest, and by reason of said lug, said sheet will be firmly held, when the clamps are in engagement with the edges thereof. Thus it will be seen that a binding relation will exist between the bar 51 and the glass sheet, and as the latter is advanced under the movement imparted by the rolls within the chamber 58, the bar 51 will be moved with the sheet, and the carriage 49 caused to travel forwardly on the track 48. During this movement of the bar 51 with the sheet, the carriage 54 is drawn across the surface of the glass sheet, and the cutter thereby severs that portion of the sheet in advance of the bar 51. The severed portion is deposited upon the truck 70, and by operating the lever 67 in the proper direction the clamp 64 will be free from engagement with the severed portion of the sheet, and by swinging the bar 51 upon the pivots 53 in an upward direction, the bar 51 may be returned to a point in proximity to the delivery throat 45 for engagement with a new portion of the sheet to effect a new cut.

An arm 95 is secured to the truck frame, as seen in Fig. 6, that extends up into the path of the supporting bar of the cutter mechanism for serving as a stop or limit of movement to the cutter mechanism when the latter is being moved to its starting position so that each sheet of glass cut off will be of the same size. Also when the truck is moved after the glass is severed, this arm 95 will move the cutter mechanism with it until the cutter mechanism is elevated out of the way of the arm. This mechanically takes the cutter mechanism away from the longitudinally moving end of the uncut sheet 100 of the glass. When ready to cut another sheet, the cutter bar is elevated and moved back in place and against the arm 95 on the subsequently placed truck.

Side strips 225 are placed adjacent the table 25 leading from the outlet opening of the tank to form a chute through which the glass may flow from the tank to the sheet-forming mechanism.

In order to start the glass as it flows in a molten state from the tank to the first set of rolls in the leer, I place between the rolls a starting plate 90, as shown in Fig. 14, although at first it extends beyond the first set of rolls slightly toward the tank, so that the glass in flowing down the chute will come in contact with it. Then the rolls are started, and they roll the starting plate 90 through the leer, and it draws the sheet of glass after it. When the starting plate has passed thus through the leer, it is removed, and then the sheet of glass thereafter continuously draws the molten glass through the rolls.

What I claim as my invention and desire to secure by Letters Patent is:

1. In a glass machine the combination with a tank for the molten glass, of a leer adjacent the same, a horizontal opening in the tank through which the glass may flow from the tank to the leer, means within the leer for forming a sheet of glass and conveying the same through the leer, means for adjusting the opening from the tank so as to regulate the flow of glass therefrom, and a movable top for the end of the leer adjacent the tank that is connected with said means for regulating the size of the outlet opening from the tank so as to move therewith and exclude the air from that portion of the leer.

2. In a glass machine, the combination with a tank for the molten glass, of a leer arranged adjacent thereto, sheet forming mechanism arranged in said leer, means for heating said leer to maintain the temperature of the glass in its passage therethrough, means for automatically feeding the molten glass from said tank to said sheet forming mechanism, a gate for controlling the flow of the molten glass from said tank to said feeding means, and a cover connected with said gate and with said leer for excluding air from the molten glass in its passage to the sheet-forming mechanism.

3. In a glass machine, means for moving a sheet of glass longitudinally, a cutter mechanism extending across the sheet of glass, and means for connecting the cutter mechanism with the sheet of glass so that it will be moved by the sheet of glass while the same is being operated to sever the sheet of glass.

4. In a glass machine, means for moving the sheet of glass longitudinally, a track parallel with the sheet of glass, a cutter supporting mechanism movable on said track and extending across the sheet of glass, and a cutter movable on said supporting mechanism transversely of the sheet of glass for severing the same.

5. In a glass machine, means for moving the sheet of glass longitudinally, a track parallel with the sheet of glass, a cutter supporting mechanism movable on said track and extending across the sheet of glass, a cutter movable on said supporting mechanism transversely of the sheet of glass for severing the same, and means for clamping the supporting mechanism to the sheet of glass.

6. In a glass machine, means for moving the sheet of glass longitudinally, a track parallel with the sheet of glass, a cutter supporting mechanism movable on said track and extending across the sheet of glass, a cutter movable on said supporting mechanism transversely of the sheet of glass for severing the same, a clamp slidably mounted on said supporting mechanism on each side of the sheet of glass for engaging each edge of the sheet of glass, and means for moving said clamps toward each other to hold the supporting mechanism in combination with the moving sheet of glass.

7. In a glass machine, means for moving a sheet of glass longitudinally, a track parallel with the sheet of glass, a cutter supporting mechanism movable on said track and extending across the sheet of glass, a cutter movable on said supporting mechanism transversely of the sheet of glass for severing the same, a clamp slidably mounted on said supporting mechanism on each side of the sheet of glass for engaging each edge of the sheet of glass, a lever pivoted to said supporting mechanism, and connecting rods running from said lever to said clamps for moving them toward and away from each other.

8. In a glass machine, means for moving a sheet of glass longitudinally, a track parallel with the sheet of glass, a carriage mounted on said track, a supporting bar pivotally mounted on said carriage and extending across the sheet of glass, means for connecting it with the sheet of glass whereby it will be moved along with the sheet, and a cutter movable on said supporting bar and across the sheet of glass for severing the same.

9. In a glass machine, means for moving a sheet of glass longitudinally, a track parallel with the sheet of glass, a carriage mounted on said track, a supporting bar pivotally mounted on said carriage and extending across the sheet of glass, means for connecting it with the sheet of glass whereby it will be moved along with the sheet, a cutter carriage movable on the supporting bar, a cutter carried by said carriage in contact with the glass, and means for drawing said cutter carriage across the sheet of glass.

10. In a glass machine, means for moving a sheet of glass longitudinally, a track parallel with the sheet of glass, a carriage movable on said track, a supporting bar connected with said carriage and extending across the sheet of glass, said supporting bar having a vertical portion, means for connecting the supporting bar with the sheet of glass so that it will move with the sheet of glass, a cutter carriage consisting of a frame, a pair of grooved rollers above and a pair below connected with said frame and riding on said supporting bar, a cutter carried by said carriage, and means for moving said carriage along said supporting bar.

11. In a glass machine, means for moving a sheet of glass longitudinally, a track parallel with the sheet of glass, a carriage movable on said track, a supporting bar connected with said carriage and extending across the sheet of glass, said supporting bar having a vertical portion, means for connecting the supporting bar with the sheet of glass so that it will move with the sheet of glass, a cutter carriage consisting of a frame and a pair of grooved rollers above and a pair below connected with said frame and riding on said supporting bar, a cutter holder mounted in said carriage, a spring for pressing said cutter holder down, a cutter in the lower end of said cutter holder, and means for moving said carriage along said supporting bar.

In witness whereof, I have hereunto affixed my signature in the presence of the witnesses herein named.

WILLIAM W. W. KEYES.

Witnesses:
R. P. KING,
NELLIE ALLEMONG.